United States Patent [19]

Moed et al.

[11] Patent Number: 5,974,404
[45] Date of Patent: Oct. 26, 1999

[54] METHOD AND APPARATUS FOR INPUT CLASSIFICATION USING A NEURAL NETWORK

[75] Inventors: Michael C. Moed, Norwalk; Chih-Ping Lee, Danbury, both of Conn.

[73] Assignee: United Parcel Service of America, Inc., Atlanta, Ga.

[21] Appl. No.: 08/881,133

[22] Filed: Jun. 24, 1997

Related U.S. Application Data

[62] Division of application No. 08/371,519, Jan. 11, 1995, Pat. No. 5,664,067, which is a continuation of application No. 07/901,123, Jun. 19, 1992, abandoned.

[51] Int. Cl.[6] .................................................. G06F 15/18
[52] U.S. Cl. ............................... 706/25; 706/20; 382/156
[58] Field of Search .................................... 706/25, 20, 6; 382/155, 156, 157, 158, 159, 160, 161

[56] References Cited

U.S. PATENT DOCUMENTS

| | | | |
|---|---|---|---|
| 3,701,095 | 10/1972 | Yamaguchi et al. | 382/156 |
| 3,950,733 | 4/1976 | Cooper et al. | 706/26 |

(List continued on next page.)

FOREIGN PATENT DOCUMENTS

| | | |
|---|---|---|
| 133589 | 6/1987 | Japan . |
| 033687 | 2/1990 | Japan . |
| 238588 | 9/1990 | Japan . |
| 242392 | 9/1990 | Japan . |
| 300876 | 12/1990 | Japan . |

OTHER PUBLICATIONS

S. Gruber, "Neural Network Based Inspections of Machined Surfaces Using Laser Scattering," Industrial Inspection II, vol. 1265, Mar. 12, 1990, The Hague, NL, pp. 85–94.

Omatu et al., "Neural Network Model for Alphabetical Letter Recognition," International Neural Network Conference, pp. 19–22, Paris, Jul. 9–13, 1990.

Specht, "Probabalistic Neural Networks for Classification, Mapping, or Associative Memory," 1988 IEEE International Conference on Neural Networks, pp. I–525—I–532.

Namatame, "A Connectionist Learning with High–Order Functional Networks and Its Internal Representation," Tools for Artificial Intelligence, pp. 542–547, Oct. 1989.

"Learning Systems Based on Multiple Neural Networks," Nestor, Inc., 1988 (14 pages).

Reilly, et al., "Learning System Architectures Composed of Multiple Learning Modules," IEEE First International Conference on Neural Networks, San Diego, CA, Jun. 21–24, 1987, pp. II–495 to II–503.

Bachmann et al., "A Relaxation Model for Memory with High Storage Density," Proc. Natl. Acad. Sci. USA, vol. 84, pp. 7529–7531, Nov. 1987, Biophysics.

Reilly et al., "A Neural Model for Category Learning," Biological Cybernetics, pp. 35–41, 1982.

Scofield et al., "Pattern Class Degeneracy in an Unrestricted Storage Density Memory," 1987 IEEE Conference on Neural Information Processing Systems, Nov. 1987.

Rumelhart et al., "Learning Internal Representations by Error Propagation," Parallel Distributed Processing, vol. I, pp. 318–362, 1986.

Wen et al., "Self–Generating Neural Networks," International Joint Conference on Neural Networks, Jun. 7–11, 1992, pp. 850–855, vol. 4.

(List continued on next page.)

*Primary Examiner*—Robert W. Downs
*Attorney, Agent, or Firm*—Schnader Harrison Segal & Lewis LLP

[57] ABSTRACT

The present invention is a classification method and apparatus for classifying an input into one of a plurality of possible outputs. The invention is also a method and apparatus for adjusting a neuron encompassing a plurality of feature vectors. The invention characterizes the spatial distribution of the feature vectors. The invention then spatially adjusts the neuron in accordance with that characterization.

8 Claims, 9 Drawing Sheets

U.S. PATENT DOCUMENTS

| | | | |
|---|---|---|---|
| 4,044,243 | 8/1977 | Cooper et al. | 706/15 |
| 4,326,259 | 4/1982 | Cooper et al. | 706/20 |
| 4,599,693 | 7/1986 | Denenberg | 706/12 |
| 4,954,963 | 9/1990 | Penz et al. | 706/20 |
| 5,010,512 | 4/1991 | Hartstein et al. | 706/18 |
| 5,033,006 | 7/1991 | Ishizuka et al. | 706/25 |
| 5,046,020 | 9/1991 | Filkin | 706/25 |
| 5,054,093 | 10/1991 | Cooper et al. | 382/159 |
| 5,058,180 | 10/1991 | Kahn | 382/158 |
| 5,060,278 | 10/1991 | Fukumizu | 706/20 |
| 5,067,164 | 11/1991 | Denker et al. | 706/20 |
| 5,086,479 | 2/1992 | Takenaga et al. | 706/20 |
| 5,091,780 | 2/1992 | Pomerleau | 706/20 |
| 5,119,438 | 6/1992 | Ueda et al. | 382/158 |
| 5,140,530 | 8/1992 | Guha et al. | 706/20 |
| 5,150,323 | 9/1992 | Castelaz | 706/22 |
| 5,175,796 | 12/1992 | Refregier | 706/20 |
| 5,181,171 | 1/1993 | McCormack et al. | 706/20 |
| 5,214,715 | 5/1993 | Carpenter et al. | 382/157 |
| 5,214,744 | 5/1993 | Schweizer et al. | 706/20 |
| 5,218,646 | 6/1993 | Sirat et al. | 706/25 |
| 5,220,618 | 6/1993 | Sirat et al. | 706/25 |
| 5,239,594 | 8/1993 | Yoda | 382/158 |
| 5,245,697 | 9/1993 | Suzuoka | 706/20 |
| 5,247,584 | 9/1993 | Krogmann | 706/10 |
| 5,251,268 | 10/1993 | Colley et al. | 382/156 |
| 5,260,871 | 11/1993 | Goldberg | 382/128 |
| 5,265,192 | 11/1993 | McCormack | 706/20 |
| 5,276,771 | 1/1994 | Manukian et al. | 706/20 |
| 5,293,454 | 3/1994 | Kamiya | 706/25 |
| 5,293,456 | 3/1994 | Guez et al. | 706/20 |
| 5,297,237 | 3/1994 | Masuoka et al. | 706/25 |
| 5,299,284 | 3/1994 | Roy | 706/20 |
| 5,311,601 | 5/1994 | Carpenter et al. | 706/20 |
| 5,313,559 | 5/1994 | Ogata et al. | 706/25 |
| 5,335,291 | 8/1994 | Kramer | 706/20 |
| 5,337,371 | 8/1994 | Sato et al. | 382/100 |
| 5,339,818 | 8/1994 | Baker et al. | 600/490 |
| 5,359,700 | 10/1994 | Seligson | 706/25 |
| 5,398,303 | 3/1995 | Tanaka | 706/6 |
| 5,426,745 | 6/1995 | Baji et al. | 706/20 |
| 5,452,399 | 9/1995 | Moed | 706/20 |
| 5,479,575 | 12/1995 | Yoda | 706/20 |
| 5,493,688 | 2/1996 | Weingard | 706/20 |
| 5,500,905 | 3/1996 | Martin et al. | 706/20 |
| 5,638,491 | 6/1997 | Moed | 706/20 |

OTHER PUBLICATIONS

Lee et al., Implementing a Self–Development Neural Network Using Doubly Linked List, Proc. 13th Ann. Annual International Computer SW and Application Conf. Sep. 20–77, 1989, pp. 672–679.

Kavuri, "Solving the Hidden Node Problem in Networks with Ellipsoidal Units and Related Issues," pp. I–775—I–780, Jun. 8, 1992.

Kelly et al., "An Adaptive Algorithm for Modifying Hyper-ellipsoidal Decision Surfaces," IV–196—IV–201, Jun. 11, 1992.

Minnix et al. "A Multi–Layered Self–Organizing Artificial Neural Network for Invariant Pattern Recognition," IEEE Transactions on Knowledge & Data Engineering, vol. 4, No. 2, Apr. 1992, pp. 162–167.

Khotanzad et al., "Distortion Invariant Character Recognition by a Multi–Layer Perception and Propagation Learning," IEEE Conf. on Neural Networks, Jul. 24–27, 1988, pp. 625–632, vol. 1.

1991 IEEE Int. Symp. on Circuits and Systems, vol. 1/5, Jun. 11, 1991, Singapore, pp. 356–359, XP000384785, Miyanaga et al., Parallel and Adaptive Clustering Method Suitable for a VLSI System.

Traitement du Signal, vol. 8, No. 6, 1991, Paris, FR, pp. 423–430, XP000360600, Minot et al., "Authentification Dynamique de Signatures par Reseaux de Neurones."

1991 IEEE Int. Symp. on Circuits and Systems, vol. 2/5, Jun. 11, 1991, Singapore XP000370414, Jou et al., A Hyperellipsoid Neueral Network for Pattern Classification Section.

Pattern Recognition Letters, vol. 13, No. 5, May 1992, Amsterdam, NL, pp. 325–329, XP000278617, Gek Sok Lim et al., "Adaptive Quadratic Neural Nets."

1990 IEEE Transactions on Systems, Man, and Cybernetics, vol. 20, No. 4, July/August 1990, pp. 816–825, Hirai et al., "Position Independent Pattern Matching by Neural Network."

1991 IEEE 10th Annual Intl. Phoenix Conf. on Computers & Comm., Mar. 27–30, 1991, pp. 39–45, Dae Su Kim et al., "Self–Organizing Neural Networks for Unsupervised Pattern Recognition."

S.V. Chakravarthy and J. Ghosh, "Efficient Training Procedures for Adaptive Kernel Classifiers," Proc. of the 1991 IEEE Workshop on Neural Networks for Signal Processing, Sep. 1991, pp. 21–29.

J–N. Hwang and H. Li, "Interactive Query Learning for Isolated Speech Recognition," Proc. of the 1992 IEEE–SP Workshop on Neural Networks for Signal Processing, pp. 93–102, Aug. 1992.

G. Acciani, et al., "Centroid estimation by means of uncompetitive unsupervised neural element," Proc. 36th Midwest Symposium on Circuits and Systems, vol. 1, pp. 426–429, Aug. 1993.

FIG. 1A
NOMINAL "O"

FIG. 1B
DEGRADED "O"

FIG. 1C
NOMINAL "7"

FIG. 1D
DEGRADED "7"

METHOD AND APPARATUS FOR INPUT
CLASSIFICATION USING A NEURAL
NETWORK

This is a divisional of application Ser. No. 08/371,519, filed on Jan. 11, 1995, which issued as U.S. Pat. No. 5,664,067, which was a file wrapper continuation of application Ser. No. 07/901,123, filed on Jun. 19, 1992, now abandoned.

BACKGROUND OF THE INVENTION

1. Field of the Invention

The present invention relates to classification methods and systems, and, in particular, to methods and systems for classifying optically acquired character images and to methods and systems for training such.

2. Statement of Related Art

In the field of package shipping, packages are routed from origins to destinations throughout the world according to destination addresses typed on shipping labels applied to these packages. In order to route packages, it is desirable to use automated optical character classification systems that can read those addresses. Such a classification system must be able to classify characters as quickly as possible. Conventional optical character classification systems using spherical neurons, such as those disclosed in U.S. Pat. No. 4,326,259 (Cooper et al.), may be unable to execute the processing requirements presented by certain applications without a substantial investment in hardware.

SUMMARY OF THE INVENTION

The present invention is a classification method and apparatus for classifying an input into one of a plurality of possible outputs. The invention generates a feature vector representative of the input. The invention then calculates a distance measure from the feature vector to the center of each neuron of a plurality of neurons, where each neuron is associated with one of the possible outputs. The invention then selects each neuron that encompasses the feature vector in accordance with the distance measure. The invention then determines a vote for each possible output, where the vote is the number of selected neurons that are associated with each possible output. If the vote for one of the possible outputs is greater than all other votes for all other possible outputs, then the invention selects that possible output as corresponding to the input. Otherwise, if the vote for one of the possible outputs is not greater than all other votes for all other possible outputs, then the invention identifies the neuron that has the smallest distance measure of all other neurons. If that smallest distance measure is less than a specified value, then the invention selects the possible output associated with that identified neuron as corresponding to the input.

The present invention is also a training method and apparatus for generating a neuron. The invention selects a plurality of training inputs, where each training input corresponds to a first possible output. The invention then characterizes the quality of each of the training inputs. The invention then selects from the characterized training inputs a training input that is of higher quality than at least one of the other training inputs. The invention then creates a neuron in accordance with the selected characterized training input.

The present invention is also a classification method for classifying an input into one of a plurality of possible outputs. The invention classifies the input into a cluster representative of two or more possible outputs. The invention then classifies the input into one of the two or more possible outputs represented by the cluster. At least one of the classification steps of the invention is characterized by comparing information representative of the input to a neuron.

The invention is also a method and apparatus for adjusting a neuron encompassing a plurality of feature vectors. The invention characterizes the spatial distribution of the feature vectors. The invention then spatially adjusts the neuron in accordance with that characterization.

BRIEF DESCRIPTION OF THE DRAWINGS

FIGS. 1(a), 1(b), 1(c), and 1(d) are bitmap representations of a nominal letter "O", a degraded letter "O", a nominal number "7", and a degraded letter "7", respectively;

FIG. 5, including

DETAILED DESCRIPTION OF THE INVENTION

Figure 2:
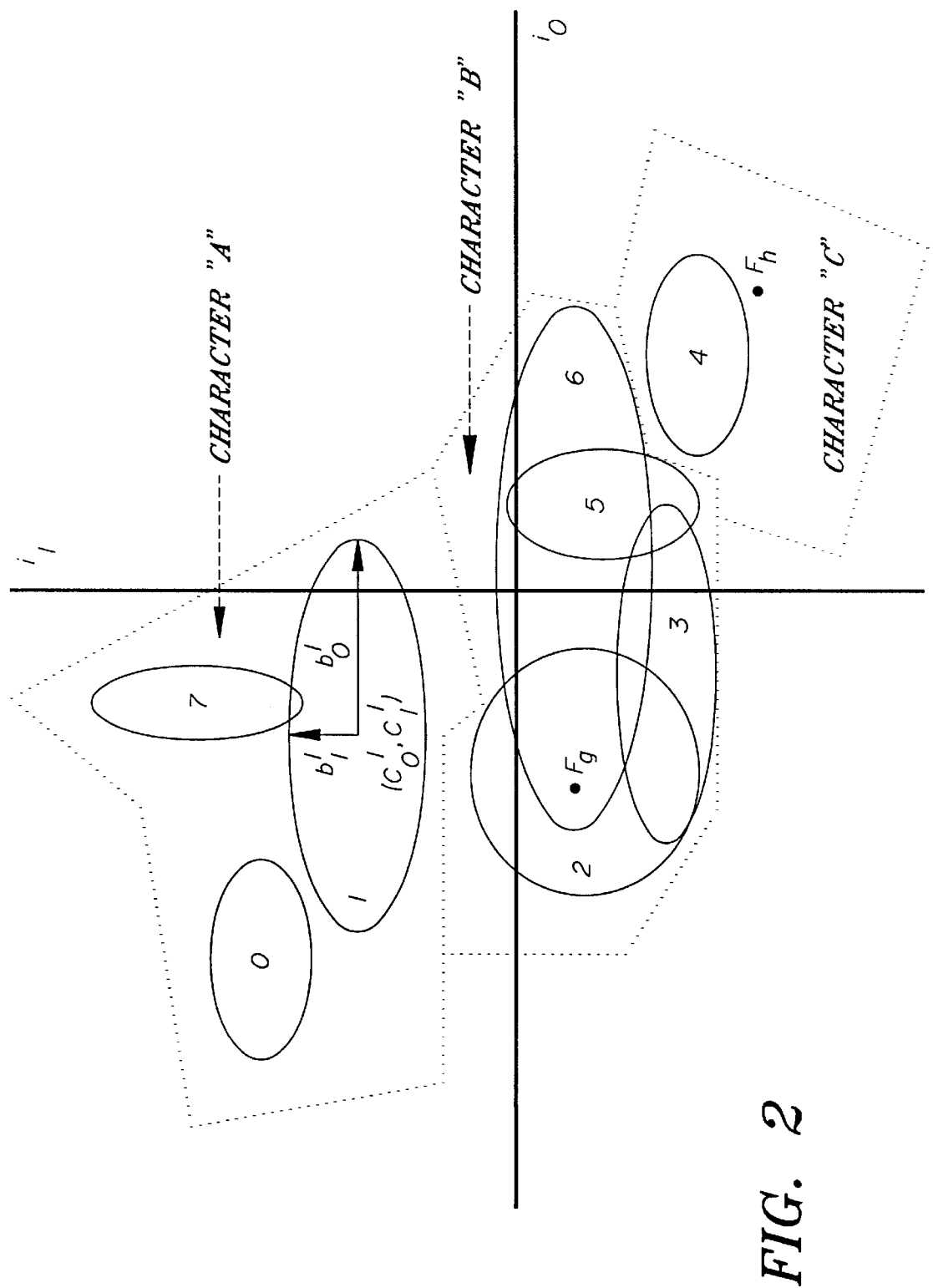
FIG. 2 is a graphical depiction of a 2-dimensional feature space populated with 8 elliptical neurons that may be employed by the classification system of the present invention to classify images of the letters A, B, and C.

The present invention includes a system for optical character recognition, but, more generally, the invention covers a classification system for classifying an input as one of a defined set of possible outputs. For example, where the input is an optically acquired image representing one of the 26 capital letters of the English alphabet, the classification system of the present invention may be used to select as an output that capital letter that is associated with the input image. The classification system of the present invention is discussed below in connection with FIGS. 1(a), 2, 3, and 4.

The present invention also includes a system for "training" the classification system of the present invention. This training system is preferably operated off line prior to deployment of the classification system. In the character recognition example, the training system accepts input images representative of known characters to "learn" about the set of possible outputs into which unknown images will eventually be classified. The training system of the present invention is discussed below in connection with FIG. 5.

The present invention also includes a system for training the classification system of the present invention based on ordering the training inputs according to the relative quality of the training inputs. This system for training is discussed below in connection with FIGS. 1(a), 1(b), 1(c), and 1(d).

The present invention also includes a system for adjusting the locations and shapes of neurons generated during the training systems of the present invention.

The present invention also includes a classification system employing a hierarchical network of top-level and lower level cluster classifiers. The top-level classifier classifies inputs into one of a plurality of output clusters, where each output cluster is associated with a subset of the set of possible outputs. A cluster classifier, associated with the output cluster identified by the top-level classifier, then classifies the input as corresponding to one of the possible outputs. This classification system is discussed below in connection with FIGS. 1(a), 1(b), 1(c), and 1(d).

The present invention also includes a neural system of classifying inputs that combines two subsystems. One subsystem counts the number of neurons that encompass a feature vector representing a particular input for each of the possible outputs. If one of the possible outputs has more neurons encompassing the feature vector than any other possible output, then the system selects that possible output as corresponding to that input. Otherwise, the second subsystem finds the neuron that has the smallest value for a particular distance measure for that feature vector. If that value is less than a specified threshold then the system selects the output associated with that neuron as corresponding to the input. This neural system is discussed below in connection with FIGS. 1(a), 2, 3, and 4.

Classification System

Referring now to FIG. 1(a), there is shown a bitmap representation of a nominal letter "O". When the classification system of the present invention classifies optically acquired character images, each character image to be classified may be represented by an input bitmap, an (m×n) image array of binary values as shown in FIG. 1(a). In a preferred embodiment, the classification system of the present invention generates a vector in a k-dimensional feature space from information contained in each input bitmap. Each feature vector F has feature elements $f_j$, where $0 \leq j \leq k-1$. The dimension of the feature space, k, may be any integer greater than one. Each feature element $f_j$ is a real value corresponding to one of k features derived from the input bitmap.

The k features may be derived from the input bitmap using conventional feature extraction functions, such as, for example, the Grid or Hadamard feature extraction function. The feature vector F represents a point in the k-dimensional feature space. The feature elements $f_j$ are the components of feature vector F along the feature-space axes of the k-dimensional feature space. For purposes of this specification, the term "feature vector" refers to a point in feature space.

In a preferred embodiment, a discriminant analysis transform may be applied to Grid-based or Hadamard-based feature vectors to define the feature space. In this embodiment, the separation between possible outputs may be increased and the dimensionality of the feature vector may be reduced by performing this discriminant analysis in which only the most significant Eigenvectors from the discriminant transformation are retained.

The classification system of the present invention compares a feature vector F, representing a particular input image, to a set of neurons in feature space, where each neuron is a closed k-dimensional region or "hyper-volume" in the k-dimensional feature space. For example, when (k=2), each neuron is an area in a 2-dimensional feature space, and when (k=3), each neuron is a volume in a 3-dimensional feature space. FIG. 2 shows a graphical depiction of an exemplary 2-dimensional feature space populated with eight 2-dimensional neurons.

In a preferred classification system according to the present invention, the boundary of at least one of the neurons populating a k-dimensional feature space is defined by at least two axes that have different lengths. Some of these neurons may be generally represented mathematically as:

$$\sum_{j=0}^{k-1} \frac{|c_j - g_j|^m}{(b_j)^m} \leq A, \quad (1)$$

where $c_j$ define the center point of the neuron, $b_j$ are the lengths of the neuron axes, and m and A are positive real constants. In a preferred embodiment, at least two of the neuron axis are of different length. The values $g_j$ that satisfy Equation (1) define the points in feature space that lie within or on the boundary of the neuron. Those skilled in the art will understand that other neurons within the scope of this invention may be represented by other mathematical expressions. For example, a neuron may be defined by the expression:

$$\underset{j=0}{\overset{k-1}{\text{MAX}}} \frac{|c_j - g_j|}{|b_j|} \leq 1, \quad (2)$$

where the function "MAX" computes the maximum value of the ratio as j runs from 0 to k-1. Neurons defined by Equation (2) are hyper-rectangles.

In a preferred embodiment of the present invention, the neurons are hyper-ellipses in the k-dimensional feature space. A hyper-ellipse is any hyper-volume defined by Equation (1), where (m=2) and (A=1). More particularly, a hyper-ellipse is defined by the function:

$$\sum_{j=0}^{k-1} \frac{(c_j - g_j)^2}{(b_j)^2} \leq 1, \quad (3)$$

where $c_j$ define the hyper-ellipse center point, $b_j$ are the hyper-ellipse axis lengths, and the values $g_j$ that satisfy Equation (3) define the points that lie within or on the hyper-ellipse boundary. When all of the axes are the same length, the hyper-ellipse is a hyper-sphere. In a preferred embodiment of the present invention, in at least one of the neurons, at least two of the axes are of different length. By way of example, there is shown in FIG. 2 elliptical neuron 1, having center point $(c_0^1, c_1^1)$, and axis $b_0^1, b_1^1$ of different length. In a preferred embodiment, the axes of the neurons are aligned with the coordinate axes of the feature space. Those skilled in the art will understand that other neurons having axes that do not all align with the feature-space axes are within the scope of the invention.

According to the present invention, each neuron is associated with a particular possible output. For example, each neuron may correspond to one of the 26 capital letters. Each neuron is associated with only one of the possible outputs (e.g., letters), but each possible output may have one or more associated neurons. Furthermore, neurons may overlap one another in feature space. For example, as shown in FIG. 2, neurons 0, 1, and 7 correspond to the character "A", neurons 2, 3, 5, and 6 correspond to the character "B", and neuron 4 corresponds to the character "C". Neurons 1 and 7 overlap, as do neurons 2, 3, and 6 and neurons 3, 5, and 6. In an alternative embodiment (not shown), neurons corresponding to different possible outputs may overlap. The classification system of the present invention may employ the neurons of FIG. 2 to classify input images representative of the letters A, B, and C.

Figure 3:
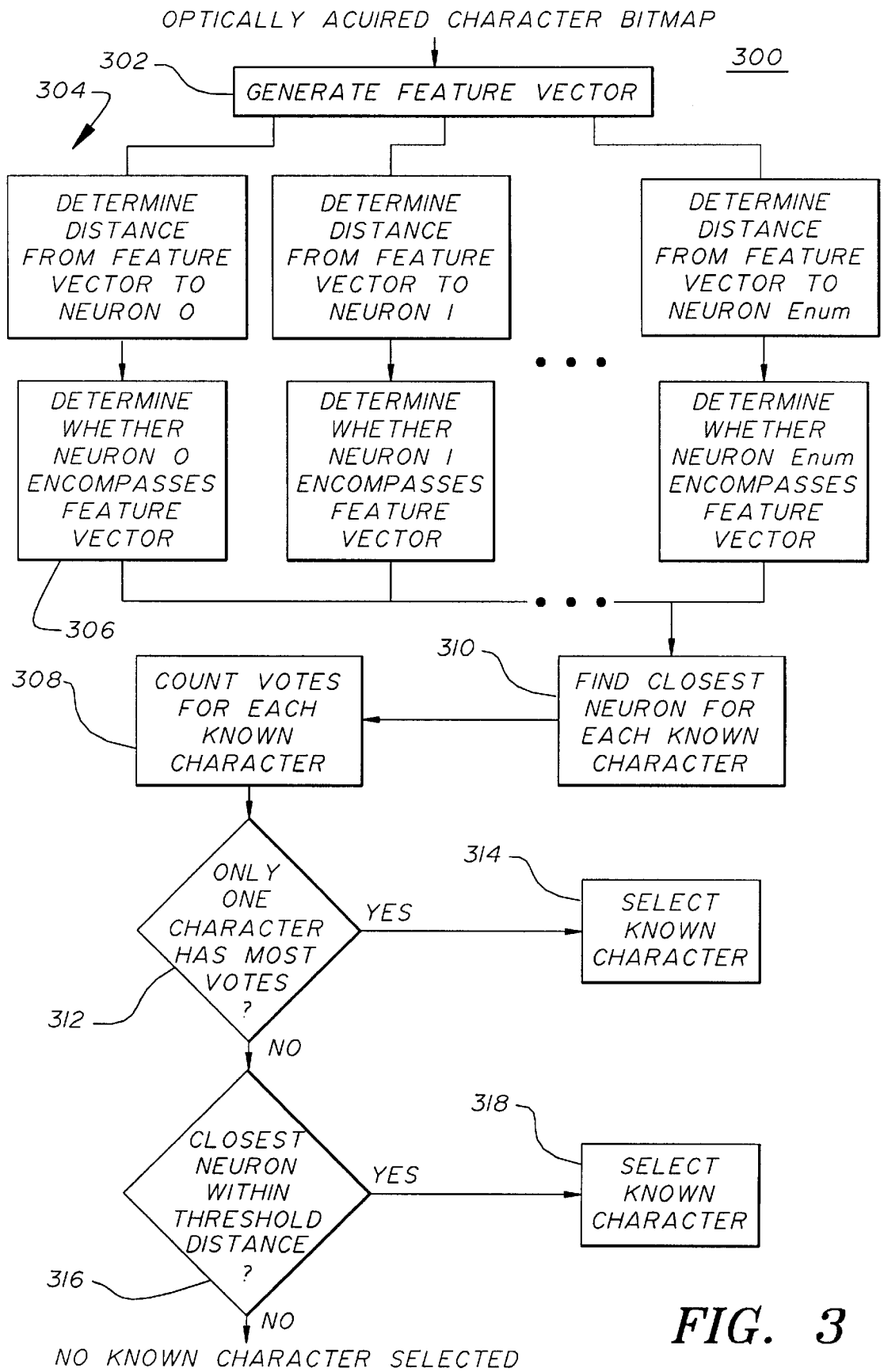
FIG. 3 is a process flow diagram for classifying inputs according to a preferred embodiment of the present invention.

Referring now to FIG. 3, there is shown a process flow diagram of classification system 300 for classifying an input (e.g., a bitmap of an optically acquired character image) as one of a set of possible outputs (e.g., characters) according to a preferred embodiment of the present invention. In the preferred embodiment shown in FIG. 3, the neurons in classification system 300 are processed in parallel. In an alternative embodiment (not shown), the neurons of classification system 300 may be processed in series. Means 302 is provided for receiving an input image bitmap and generating a feature vector that represents information contained in that bitmap. Means 304 and 306 are provided for comparing the feature vector generated by means 302 to a set of neurons, at least one of which has two or more axes of different length. Classification system 300 selects one of the possible outputs based upon that comparison.

In a preferred embodiment of the present invention, classification system 300 classifies optically acquired character bitmaps using a network of hyper-elliptical neurons. Means 302 of classification system 300 receives as input the bitmap of an optically acquired character image to be classified and generates a corresponding feature vector F. Means 304 then determines an "elliptical distance" $r_x$ as a function of the center and axes of each of the $E_{num}$ hyper-elliptical neurons x in the network and feature vector F, where:

$$r_x = \sum_{j=0}^{k-1} \frac{(f_j - c_j^x)^2}{(b_j^x)^2}, \quad (4)$$

In Equation (4), $c_j^x$ and $b_j^x$ define the center point and axis lengths, respectively, of neuron x, where x runs from 0 to $E_{num}-1$, and $f_j$ are the elements of feature vector F. Those skilled in the art would recognize that distance measures different from that of Equation (4) may also be used.

Means 306 determines which, if any, of the $E_{num}$ neurons encompass feature vector F. A neuron encompasses a feature vector—and may be referred to as an "encompassing neuron"—if the feature vector lies inside the boundary that defines the neuron in feature space. For hyper-ellipses, neuron x encompasses feature vector F, if ($r_x$<1). If ($r_x$=1), feature vector F lies on the boundary of neuron x, and if ($r_x$>1), feature vector F lies outside neuron x. Since neurons may overlap in feature space, a particular feature vector may be encompassed by more than one neuron. In FIG. 2, feature vector $F_g$, corresponding to a particular input image, is encompassed by neurons 2 and 6. Alternatively, a feature vector may lie inside no neurons, as in the case of feature vector $F_h$ of FIG. 2, which corresponds to a different input image.

Means 308 finds the "closest" neuron for each possible output. As described earlier, each neuron is associated with one and only one possible output, but each possible output may have one or more neurons associated with it. Means 308 analyzes all of the neurons associated with each possible output and determines the neuron "closest" to feature vector F for that output. The "closest" neuron will be the one having the smallest "distance" measure value $r_x$. In the example of feature vector $F_g$ of FIG. 2, means 308 will select neuron 1 as being the "closest" neuron to feature vector $F_g$ for the character "A". It will also select neuron 2 as the "closest" neuron for character "B" and neuron 4 for character "C".

Means 310 in FIG. 3 counts votes for each possible output. In a first preferred embodiment, each neuron that encompasses feature vector F is treated by means 310 as a single "vote" for the output associated with that neuron. In an alternative preferred embodiment discussed in greater detail with respect to Equation (7) below, each neuron that encompasses feature vector F is treated by means 310 as representing a "weighted vote" for the output associated with that neuron, where the weight associated with any particular neuron is a function of the number of training input feature vectors encompassed by that neuron. In a preferred embodiment, means 310 implements proportional voting, where the weighted vote for a particular neuron is equal the number of feature vectors encompassed by that neuron. For each possible output, means 310 tallies all the votes for all the neurons that encompass feature vector F. There are three potential types of voting outcomes: either (1) one output character receives more votes than any other output character, (2) two or more output characters tie for the most votes, or (3) all output characters receive no votes, indicating the situation where no neurons encompass feature vector F. In FIG. 2, feature vector $F_g$ may result in the first type of voting outcome: character "B" may receive 2 votes corresponding to encompassing neurons 2 and 6, while characters "A" and "C" receive no votes. Feature vector $F_h$ of FIG. 2 results in the third type of voting outcome with each character receiving no votes.

Means 312 determines if the first type of voting outcome resulted from the application of means 310 to feature vector F. If only one of the possible output characters received the most votes, then means 312 directs the processing of classification system 300 to means 314, which selects that output character as corresponding to the input character bitmap. Otherwise, processing continues to means 316. For feature vector $F_g$ in FIG. 2, means 312 determines that character "B" has more votes than any other character and directs means 314 to select "B" as the character corresponding to feature vector $F_g$. For feature vector $F_h$ in FIG. 2, means 312 determines that no single character received the most votes and directs processing to means 316.

Means 316 acts as a tie-breaker for the second and third potential voting outcome in which no outright vote-leader exists, either because of a tie or because the feature vector lies inside no neurons. To break the tie, means 316 selects that neuron x which is "closest" in elliptical distance to feature vector F and compares $r_x$ to a specified threshold value $\Theta^m$. If ($r_x \leq \Theta^m$), then means 318 selects the output character associated with neuron x as corresponding to the input character bitmap. Otherwise, the tie is not broken and classification system 300 selects no character for the input image. A "no-character-selected" result is one of the possible outputs from classification system 300. For example, if classification system 300 is designed to recognize capital letters and the input image corresponds to the number "7", a no-character-selected result is an appropriate output.

Threshold value em may be any number greater than 1 and is preferably about 1.25. As described earlier, when feature vector F is inside neuron x, then ($r_x$<1), and when feature vector F is outside neuron x, then ($r_x$>1). If the voting result from means 310 is a tie for the most non-zero votes, then means 316 will select the output character associated with the encompassing neuron having a center which is "closest" in elliptical "distance" feature vector F. Alternatively, if there are no encompassing neurons, means 316 may still classify the input bitmap as corresponding to the output character associated with the "closest" neuron X, if ($r_x \leq \Theta^m$). Using a threshold value $\Theta^m$ of about 1.25 establishes a region surrounding each neuron used by means 316 for tie-breaking. In FIG. 2, feature vector $F_h$ will be classified as character "C" if the "distance" measure $r_4$ is less than the threshold value $\Theta^m$; otherwise, no character is selected.

Figure 4:
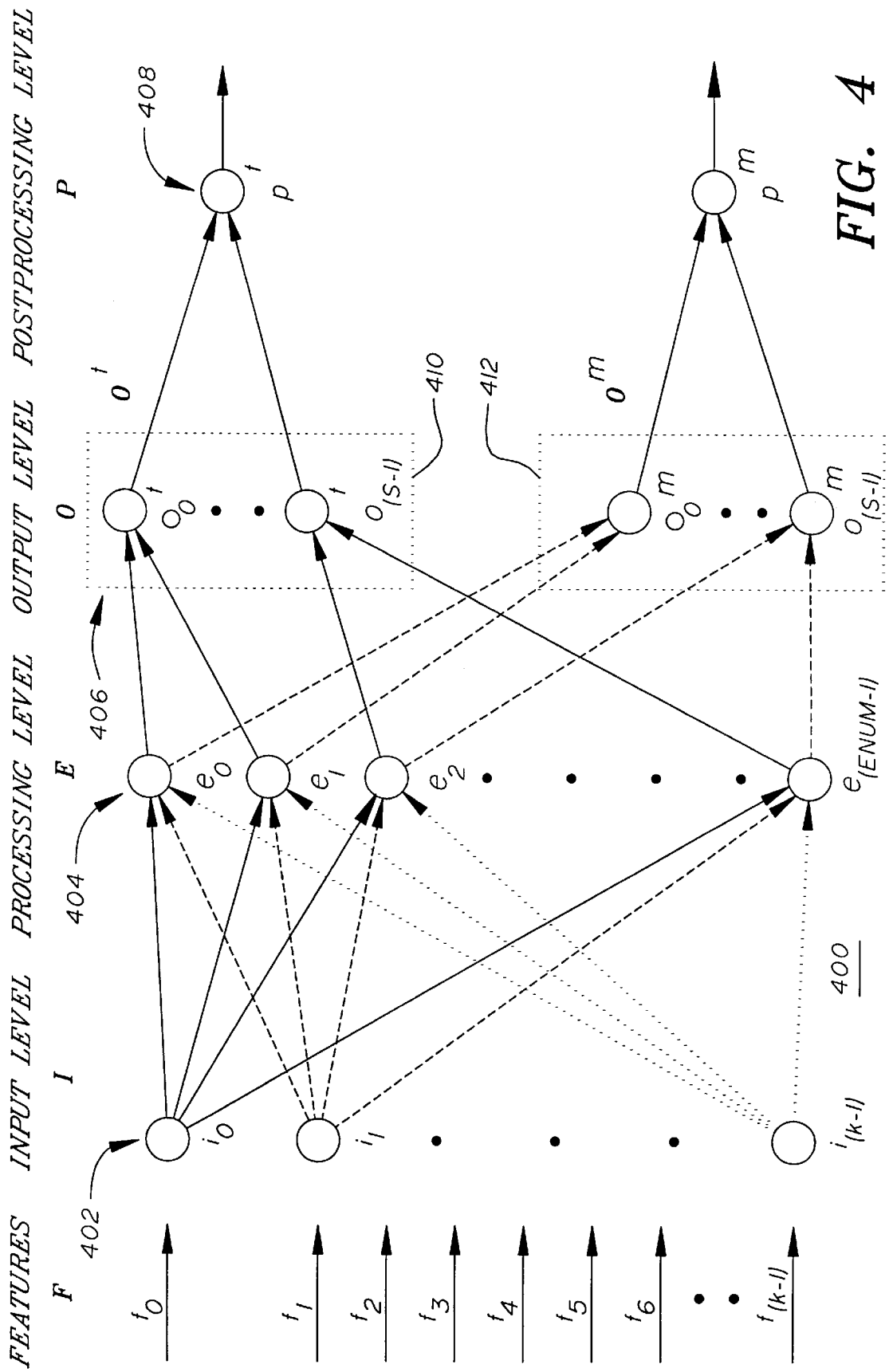
FIG. 4 is a schematic diagram of part of the classification system of FIG. 3.
Figure 5A:
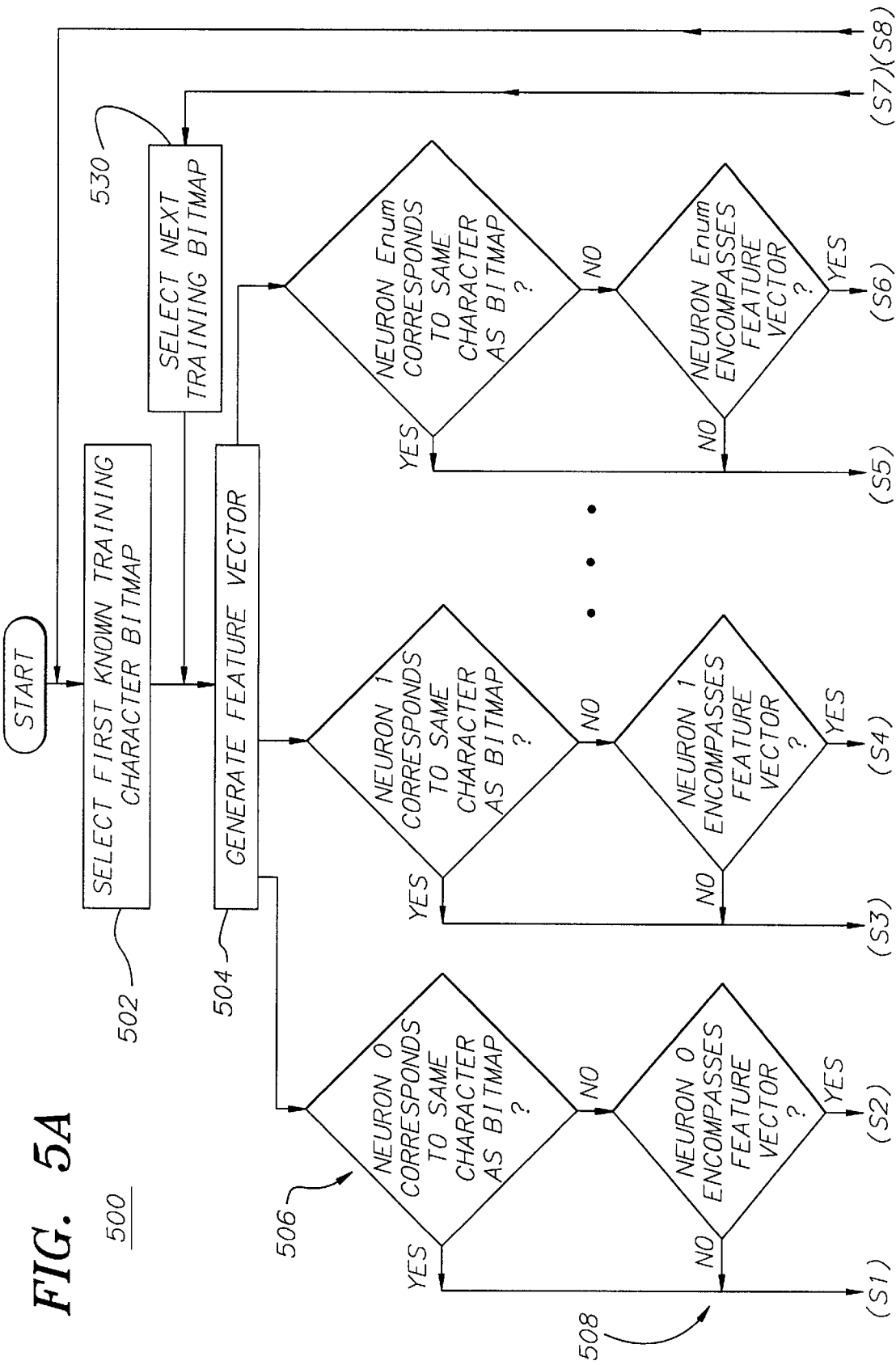
FIGS. 5A–5D, is a process flow diagram for generating neurons used by the classification system of FIG. 3.
Figure 5B:
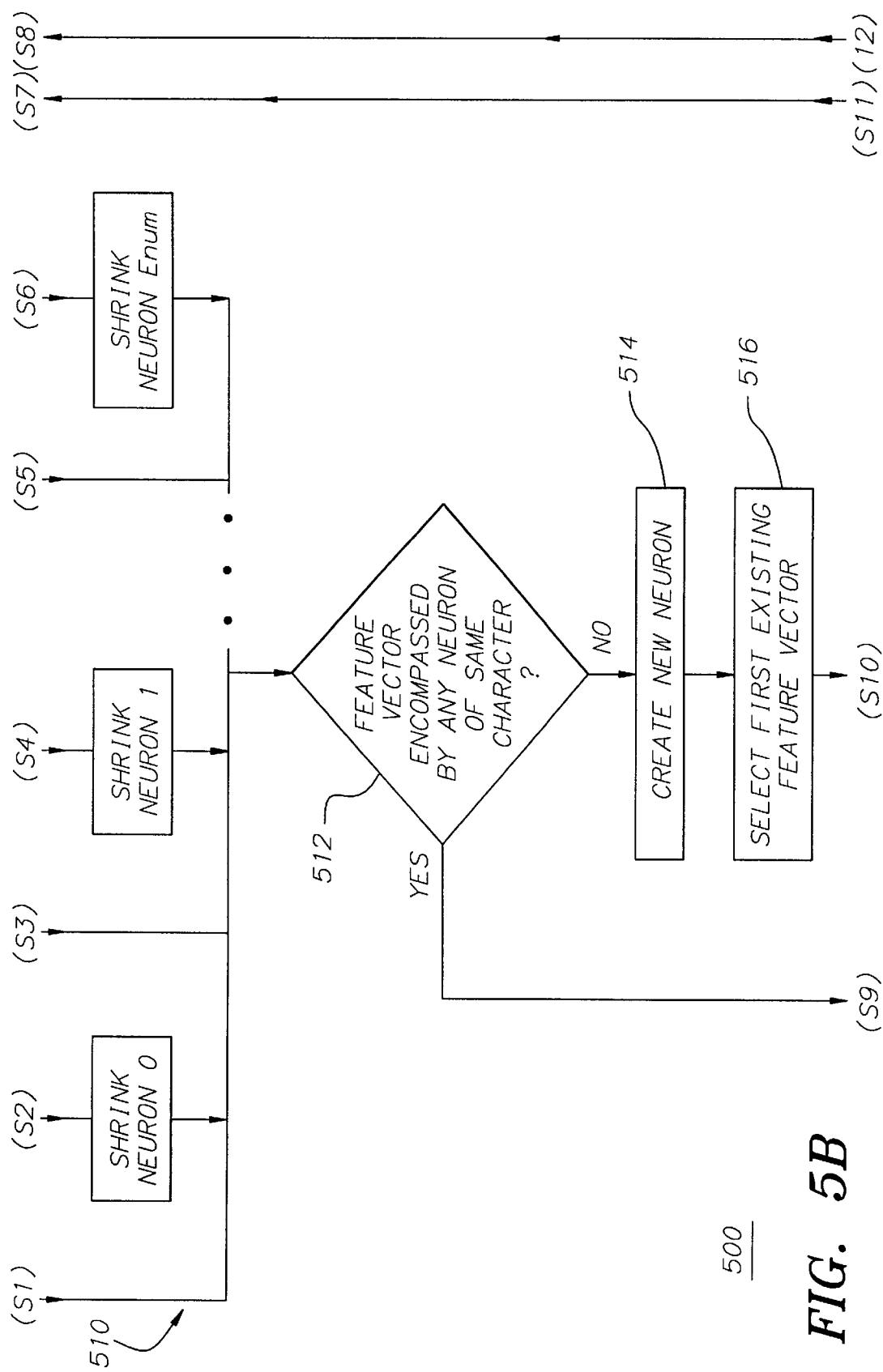
Figure 5C:
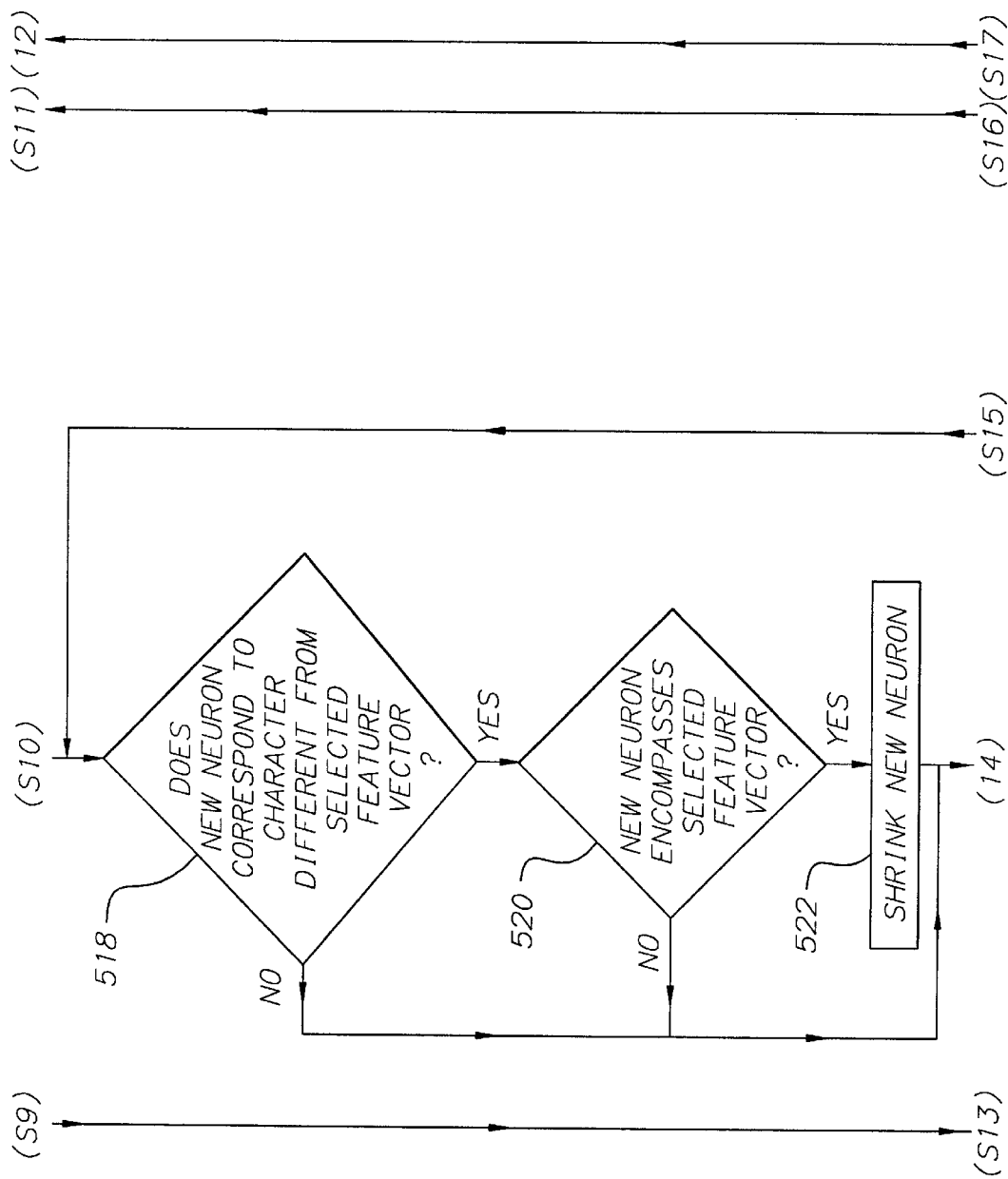
Figure 5D:
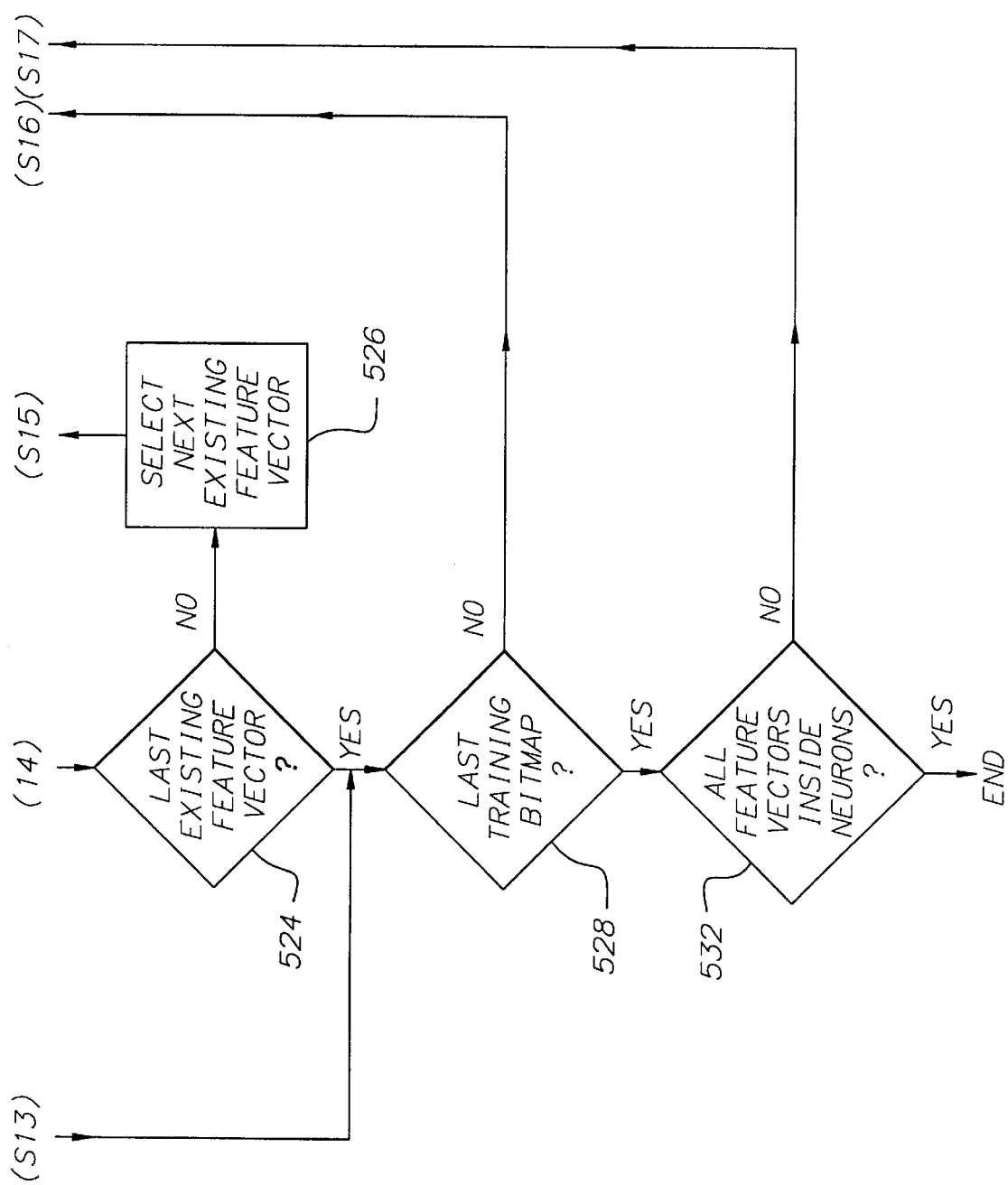

Referring now to FIG. 4, there is shown a schematic diagram of classification system 400 of the present invention for classifying inputs as corresponding to a set of s possible outputs. Classification system 400 may perform part of the processing performed by classification system 300 of FIG. 3. Classification system 400 accepts feature vector F, represented by feature elements ($f_0$, $f_1$, ..., $f_{k-1}$, and generates values $q^t$ and $q^m$ that act as pointers and/or flags to indicate the possible output to be selected. Classification system 400 includes four subsystem levels: input level 402, processing level 404, output level 406, and postprocessing level 408.

Input level 402 includes the set I of k input processing units $i_j$, where j runs from 0 to k-1. Each input processing unit $i_j$ receives as input one and only one element $f_j$ of the feature vector F and broadcasts this value to processing level 404. Input level 402 functions as a set of pass-through, broadcasting elements.

Processing level 404 includes the set E of $E_{num}$ elliptical processing units $e_x$, where x runs from 0 to $E_{num}-1$. Each elliptical processing unit $e_x$ is connected to and receives input from the output of every input processing unit $i_j$ of input level 402. Elliptical processing unit $e_x$ implements Equation (4) for neuron x of classification system 300 of FIG. 3. Like neuron x of classification system 300, each elliptical processing unit $e_x$ is defined by two vectors of internal parameters: $B^x$ and $C^x$. The elements of vector $B^x$ are the lengths of the axes of neuron x, where:

$$B^x = (b_0^x, b_1^x, \ldots, b_{k-1}^x)^T, \quad (5)$$

and the elements of vector $C^x$ are the coordinates of the center point of neuron x, where:

$$C^x = (c_0^x, c_1^x, \ldots, c_{k-1}^x)^T. \quad (6)$$

Each elliptical processing unit $e_x$ of processing level 404 computes the distance measure $r_x$ from feature vector F to the center of neuron x. Processing level 404 is associated with means 304 of classification system 300. If ($r_x<1$), then elliptical processing unit $e_x$ is said to be activated; otherwise, elliptical processing unit $e_x$ is not activated. In other words, elliptical processing unit $e_x$ is activated when neuron x encompasses feature vector F. Each elliptical processing unit $e_x$ broadcasts the computed distance measure $r_x$ to only two output processing units of output level 406.

Output level 406 includes two parts: output-total part 410 and output-minimize part 412. Output-total part 410 contains the set $O^t$ of s output processing units $o_n^t$, and output-minimize part 412 contains the set $O^m$ of s output processing units $o_n^m$, where n runs from 0 to s-1, where s is also the number of possible outputs for which classification system 400 has been trained. For example, when classifying capital letters, s=26. Each processing unit pair ($o_n^t, o_n^m$) is associated with only one possible output and vice versa.

Each elliptical processing unit $e_x$ of processing level 404 is connected to and provides output to only one output processing unit $o_n^t$ of output-total part 410 and to only one output processing unit $o_n^m$ of output-minimize part 412. However, each output processing unit $o_n^t$ and each output processing unit $o_n^m$ may be connected to and receive input from one or more elliptical processing units $e_x$ of processing level 404. These relationships are represented by connection matrices $W^t$ and $W^m$, both of which are of dimension (s×$E_{num}$). In a preferred embodiment, if there is a connection between elliptical processing unit $e_x$ of processing level 400 and output processing unit $o_n^t$ of output-total part 410 of output level 406, an entry $w_{nx}^t$ in connection matrix $W^t$ will have a value that is equal to the number of training input feature vectors encompassed by neuron x; otherwise, it has value 0. In a further preferred embodiment, entry $w_{nx}^t$ has a value 1 if there is a connection between elliptical processing unit $e_x$ and output processing unit $O_n^t$. Connection matrix $W^m$ represents the connections between processing level 404 and output-minimize part 412 of output level 406 and is related to connection matrix $W^t$. An entry $w_{nx}^m$ in connection matrix $W^m$ will have a value of 1 for every entry $w_{nx}^t$ in connection matrix $W^t$ that is not zero. Otherwise, entry $w_{nx}^m$ will have a value of 0.

Each output processing unit $o_n^t$ in output-total part 410 computes an output value $o_n^t$, where:

$$o_n^t = \sum_{x=0}^{E_{num}-1} w_{nx}^t T(r_x), \quad (7)$$

where the function $T(r_x)$ returns the value 0 if ($r_x>1$); otherwise, it returns the value 1. In other words, the function $T(r_x)$ returns the value 1 if elliptical processing unit $e_x$ of processing level 404 is activated. Output processing unit $o_n^t$ counts the votes for the possible output with which it is associated and outputs the total. Output-total part 410 of output level 406 is associated with means 306 and means 310 of classification system 300.

Similarly, each output processing unit $o_n^m$ in output-minimize part 412 computes an output value $o_n^m$, where:

$$o_n^m = \mathop{\mathrm{MIN}}_{x=0}^{E_{num}-1} (w_{nx}^m r_x), \quad (8)$$

for all $w_{nx}^m \neq 0$ where the function "MIN" returns the minimum value of ($w_{nx}^m r_x$) over all the elliptical processing units $e_x$. Therefore, each output processing unit $o_n^m$ examines each of the elliptical processing units $e_x$ to which it is connected and outputs a real value equal to the minimum output value from these elliptical processing units. Output-minimize part 412 of output level 406 is associated with means 308 of classification system 300.

Postprocessing level 408 includes two postprocessing units $p^t$ and $p^m$. Postprocessing unit $p^t$ is connected to and receives input from every output processing unit $o_n^t$ of output-total part 410 of output level 406. Postprocessing unit $p^t$ finds the output processing unit $o_n^t$ that has the maximum output value and generates the value $q^t$. If output processing unit $o_n^t$ of output-total part 410 has an output value greater than those of all the other output processing units of output-total part 410, then the value $q^t$ is set to n—the index for that output processing unit. For example, when classifying capital letters n may be O for "A" and 1 for "B", etc. Otherwise, the value $q^t$ is set to -1 to indicate that output-total part 410 of output level 406 did not classify the input. Postprocessing unit $p^t$ of postprocessing level 408 is associated with means 312 of classification system 300.

Similarly, postprocessing unit $p^m$—the other postprocessing unit in postprocessing level 408—is connected to and receives input from every output processing unit $o_n^m$ of output-minimize part 412 of output level 406. Postprocessing unit $p^m$ finds the output processing unit $o_n^m$ that has the minimum output value and generates the value $q^m$. If output processing unit $o_n^m$ of output-minimize part 412 has an output value less than a specified threshold $\Theta^m$, then the value $q^m$ is set to the corresponding index n. Otherwise, the value q'" is set to −1 to indicate that output-minimize part 412 of output level 406 did not classify the input, because the feature vector F is outside the threshold region surrounding neuron x for all neurons x. The threshold $\Theta^m$ may be the same threshold $\Theta^m$ used in classification system 300 of FIG. 3. Postprocessing unit $p^m$ of postprocessing level 408 is associated with means 316 of classification system 300.

Classification of the input is completed by analyzing the values $q^t$ and $q^m$. If ($q^t \neq -1$), then the input is classified as possible output $q^t$ of the set of s possible outputs. If ($q^t = -1$) and ($q^m \neq -1$), then the input is classified as possible output $q^m$ of the set of s possible outputs. Otherwise, if both values are −1, then the input is not classified as any of the s possible outputs.

Training System

A neural network must be trained before it may be used to classify inputs. The training system of the present invention performs this required training by generating at least one non-spherical neuron in the k-dimensional feature space. The training system is preferably implemented off line prior to the deployment of a classification system.

The training system of the present invention generates neurons based upon a set of training inputs, where each training input is known to correspond to one of the possible outputs in the classification set. Continuing with the example of capital letters used to describe classification system 300, each training input may be a bitmap corresponding to one of the characters from "A" to "Z". Each character must be represented by at least one training input, although typically 250 to 750 training inputs are used for each character.

Referring now to FIG. 5, there is shown a process flow diagram of training system 500 for generating neurons in k-dimensional feature space that may be used in classification system 300 of FIG. 3 or in classification system 400 of FIG. 4. For example, when training for output classification, training system 500 sequentially processes a set of training bitmap inputs corresponding to known outputs. At a particular point in the training, there will be a set of existing feature vectors that correspond to the training inputs previously processed and a set of existing neurons that have been generated from those existing feature vectors. For each training input, training system 500 generates a feature vector in a feature space that represents information contained in that training input.

Training system 500 applies two rules in processing each training input. The first training rule is that if the feature vector, corresponding to the training input currently being processed, is encompassed by any existing neurons that are associated with a different known output, then the boundaries of those existing neurons are spatially adjusted to exclude that feature vector—that is, to ensure that that feature vector is not inside the boundary of those existing neurons. Otherwise, neurons are not spatially adjusted. For example, if the current training input corresponds to the character "R" and the feature vector corresponding to that training input is encompassed by two existing "P" neurons and one existing "B" neuron, then the boundaries of these three existing neurons are spatially adjusted to ensure they do not encompass the current feature vector.

The second training rule is that if the current feature vector is not encompassed by at least one existing neuron that is associated with the same known output, then a new neuron is created. Otherwise, no new neuron is created for the current feature vector. For example, if the current training input corresponds to the character "W" and the feature vector corresponding to that training input is not encompassed by any existing neuron that is associated with the character "W", then a new "W" neuron is created to encompass that current feature vector. In a preferred embodiment, a new neuron is created by generating a temporary hyperspherical neuron and then spatially adjusting that temporary neuron to create the new neuron. In an alternative preferred embodiment, the temporary neuron may be a non-spherical hyper-ellipse.

In a preferred embodiment of the present invention, training system 500 generates hyper-elliptical neurons from a set of training bitmap inputs corresponding to known characters. Training system 500 starts with no existing feature vectors and no existing neurons. Processing of training system 500 begins with means 502 which selects as the current training input a first training input from a set of training inputs. Means 504 generates the feature vector F that corresponds to the current training input.

When the first training input is the current training input, there are no existing neurons and therefore no existing neurons that encompass feature vector F. In that case, processing of training system 500 flows to means 514 which creates a new neuron centered on feature vector F. The new neuron is preferably defined by Equation (3), where all the new neuron axes are set to the same length, that is, ($b_j = \lambda$) for all j. Since the new neuron axes are all the same length, the new neuron is a hyper-sphere in feature space of radius $\lambda$. In a preferred embodiment, the value of constant $\lambda$ may be twice as large as the largest feature element $f_j$ of all the feature vectors F for the entire set of training inputs. Since there are no existing feature vectors when processing the first training input, training system 500 next flows to means 528 from which point the processing of training system 500 may be described more generally.

Means 528 determines whether the current training input is the last training input in the set of training inputs. If not, then means 528 directs processing of training system 500 to means 530 which selects the next training input as the current training input. Means 504 then generates the feature vector F corresponding to the current training input.

Means 506 and 508 determine which, if any, existing neurons are to be spatially adjusted to avoid encompassing feature vector F. In a preferred embodiment, means 510 adjusts an existing neuron if that neuron is not associated with the same known character as the current training input (as determined by means 506) and if it encompasses feature vector F (as determined by means 508). Means 508 determines if an existing neuron encompasses feature vector F by calculating and testing the "distance" measure $r_x$ of Equation (4) and testing whether ($r_x < 1$) as described earlier.

In a preferred embodiment, means 510 spatially adjusts an existing neuron by optimally shrinking it along only one axis. In another preferred embodiment, means 510 shrinks an existing neuron proportionally along one or more axes. These shrinking methods are explained in greater detail later in this specification. After processing by means 510, the current feature vector is not encompassed by any existing neurons that are associated with a character which is different from the character associated with the training input. Hence, the current feature vector lies either outside or on the boundaries of such existing neurons.

Training system 500 also determines if a new neuron is to be created and, if so, creates that new neuron. A new neuron is created (by means 514) if the feature vector P is not encompassed by any existing neuron associated with the same character as the training input (as determined by means 512). As described above, means 514 creates a new neuron that is, preferably, a hyper-sphere of radius $\lambda$.

Training system 500 then tests and, if necessary, spatially adjusts each new neuron created by means 514 to ensure that it does not encompass any existing feature vectors that are associated with a character which is different from the character associated with the training input. Means 516, 524, and 526 control the sequence of testing a new neuron against each of the existing feature vectors by selecting one of the existing-feature vectors at a time. If a new neuron is associated with a character different from that of the currently selected existing feature vector (as determined by means 518) and if the new neuron encompasses that selected existing feature vector (as determined by means 520 using Equation (4)), then means 524 spatially adjusts the new neuron by one of the same shrinking algorithms employed by means 510. Training system 500 continues to test and adjust a new neuron until all existing feature vectors have been processed. Since the hyper-spherical neuron created by means 514 is adjusted by means 522, that hyper-spherical neuron is a temporary neuron with temporary neuron axes of equal length. Processing of training system 500 then continues to means 528 to control the selection of the next training input.

In a preferred embodiment, the steps of (1) shrinking existing neurons for a given input, and (2) creating and shrinking a new neuron created for that same input may be performed in parallel. Those skilled in the art will understand that these two steps may also be performed sequentially in either order.

In a preferred embodiment, after all of the training inputs in the set of training inputs have been processed sequentially, means 528 directs processing of training system 500 to means 532. After processing a set of training inputs with their corresponding feature vectors, feature space is populated with both feature vectors and neurons. After processing the set of training inputs one time, some feature vectors may not be encompassed by any neurons. This occurs when feature vectors, that were, at some point in the training process, encompassed by neuron(s) of the same character, become excluded from those neurons when those neurons were shrunk to avoid subsequent feature vectors associated with a different character. In such a situation, means 532 directs processing to return to means 502 to repeat processing of the entire set of training inputs. When repeating this processing, the previously created neurons are retained. By iteratively repeating this training process, new neurons are created with each iteration until eventually each and every feature vector is encompassed by one or more neurons that are associated with the proper output and no feature vectors are encompassed by neurons associated with different possible outputs. Moreover, this iterative training is guaranteed to converge in a finite period of time with the maximum number of iterations being equal to the total number of training inputs.

After training system 500 completes its processing, the feature space is populated with neurons that may then be used by characterization system 300 or characterization system 400 to classify an unknown input into one of a plurality of possible outputs.

Optimal One-Axis Shrinking

As mentioned earlier, in a preferred embodiment, training system 500 spatially adjusts the boundary of a hyper-elliptical neuron to exclude a particular feature vector by optimally shrinking along one axis. Means 510 and 522 of training system 500 may perform this one-axis shrinking by (1) identifying the axis to shrink, and (2) calculating the new length for that axis.

Training system 500 identifies the axis n to shrink by the formula:

$$n = \mathop{\mathrm{argmax}}_{0 \le i \le k-1} \left[ \frac{\left(\sum_{\substack{j=0 \\ j \ne i}}^{k-1} b_j\right) \cdot |f_i - c_i|}{\sqrt{1 - \sum_{\substack{j=0 \\ j \ne i}}^{k-1} \frac{(f_j - c_j)^2}{b_j^2}}} \right], \quad (9)$$

where the function "argmax" returns the value of i that maximizes the expression in the square brackets for any i from 0 to k−1; $c_j$ and $b_j$ define the center point and axis lengths, respectively, of the neuron to be adjusted; and $f_j$ define the feature vector to be excluded by that neuron.

Training system 500 then calculates the new length $b_n$ for axis n by the equation:

$$b'_n = \frac{|f_n - c_n|}{\sqrt{1 - \sum_{\substack{j=0 \\ j \ne n}}^{k-1} \frac{(f_j - c_j)^2}{b_j^2}}}. \quad (10)$$

In one-axis shrinking, all other axes retain their original lengths $b_j$.

One-axis shrinking of an original hyper-elliptical neuron according to Equations (9) and (10) results in an adjusted neuron with the greatest hyper-volume V that satisfies the following four criteria:

(1) The adjusted neuron is a hyper-ellipse;
(2) The center point of the original neuron is the same as the center point of the adjusted neuron;
(3) The feature vector to be excluded lies on the boundary of the adjusted neuron; and
(4) All points within or on the boundary of the adjusted neuron lie within or on the boundary of the original neuron.

The hyper-volume V is defined by:

$$V = C_k \prod_{j=0}^{k-1} b_j, \quad (11)$$

where $C_k$ is a constant that depends on the value of k, where k is the dimension of the feature space, and $b_j$ are the lengths of the axes defining the adjusted neuron. One-axis shrinking, therefore, provides a first method for optimally adjusting neurons according to the present invention.

Proportional Shrinking Algorithm

In alternative preferred embodiment, training system 500 spatially adjusts the boundary of a hyper-elliptical neuron to exclude a particular feature vector by shrinking proportionally along one or more axes. Means 510 and 522 of training system 500 may perform proportional shrinking by calculating the vector AB of axis length changes Δb, where:

$$\Delta B = -\alpha \left[ \frac{|F - C|^T}{\|F - C\|} \right] \cdot (B^T B - [F - C]^T [F - C]) - \Gamma, \quad (12)$$

where:

$$\Delta B = (\Delta b_0, \Delta b_1, \ldots, \Delta b_{k-1}), \quad (13)$$

$$\frac{|F - C|^T}{\|F - C\|} = \text{Vector of Cosines}, \quad (14)$$

$$|F - C|^T = (|f_0 - c_0|, |f_1 - c_1|, \ldots, |f_{k-1} - c_{k-1}|), \quad (15)$$

$$F = (f_0, f_1, \ldots, f_{k-1})^T, \quad (16)$$

$$C = (c_0, c_1, \ldots, c_{k-1})^T, \quad (17)$$

$$\underline{B} = \begin{bmatrix} b_0 & 0 & 0 & \ldots & 0 \\ 0 & b_1 & 0 & \ldots & 0 \\ 0 & 0 & b_2 & \ldots & 0 \\ \vdots & \vdots & \vdots & \ddots & \vdots \\ 0 & 0 & 0 & \ldots & b_{k-1} \end{bmatrix}, \quad (18)$$

$$\underline{F} = \begin{bmatrix} f_0 & 0 & 0 & \ldots & 0 \\ 0 & f_1 & 0 & \ldots & 0 \\ 0 & 0 & f_2 & \ldots & 0 \\ \vdots & \vdots & \vdots & \ddots & \vdots \\ 0 & 0 & 0 & \ldots & f_{k-1} \end{bmatrix}, \quad (19)$$

$$\underline{C} = \begin{bmatrix} c_0 & 0 & 0 & \ldots & 0 \\ 0 & c_1 & 0 & \ldots & 0 \\ 0 & 0 & c_2 & \ldots & 0 \\ \vdots & \vdots & \vdots & \ddots & \vdots \\ 0 & 0 & 0 & \ldots & c_{k-1} \end{bmatrix}, \quad (20)$$

and $$\Gamma = (\gamma_0, \gamma_1, \ldots, \gamma_{k-1}), \quad (21)$$

where $|f_0 - c_0|$ is the absolute value of, $(f_0 - c_0)$; $\|F - C\|$ is the magnitude of the vector difference between F and C; $c_j$ and $b_j$ define the center point and axis lengths, respectively, of the neuron to be adjusted; $f_j$ are the elements of the feature vector to be excluded from that neuron; and $\alpha$ and $\gamma_j$ may be constants. The new axis lengths $b'_j$ for the adjusted neuron are calculated by:

$$b'_j = b_j + \Delta b_j \quad (22)$$

for j from 0 to k−1.

In proportional shrinking, training system 500 determines the projections of a vector onto the axes of the neuron to be adjusted, where the vector points from the center of that neuron to the feature vector to be excluded. These projections are represented by the vector of cosines of Equation (14). Training system 500 then determines how much to shrink each neuron axis based on the relationship between the length of the axis and the length of the projection onto that axis.

In a preferred embodiment, the constant $\alpha$ in Equation (12) is selected to be less than 1. In this case, training system 500 may perform iterative shrinking, where the neuron is slowly adjusted over multiple axis-shrinking steps until it is determined that the feature vector to be excluded is outside the adjusted neuron. In a preferred embodiment, parameter $\gamma_j$ may be set to a positive value that is roughly 0.001 times the size of axis j to ensure that proportional shrinking eventually places the feature vector outside the neuron. In an alternative preferred embodiment, the parameters $\gamma_j$ may be error functions based on the distance from the feature vector to the boundary of the slowly adjusted neuron. In such case, training system 500 may operate as a proportional integral controller for adjusting neurons.

Ordering of Training Inputs

In a preferred embodiment of the present invention, the set of training inputs, used sequentially by the training system to generate neurons, may be organized according to input quality. The training inputs may be ordered to train with higher quality inputs before proceeding to those of lower quality. This quality ordering of training inputs ensures that neurons are centered about feature vectors that correspond to inputs of higher quality. Such ordered training may improve the performance efficiency of a classification system by reducing the numbers of neurons needed to define the classification system. Such ordering may also reduce the numbers of misclassifications and non-classifications made by the classification system. A misclassification is when a classification system selects one possible output when, in truth, the input corresponds to a different possible output. A non-classification is when a classification system fails to select one of the known outputs and instead outputs a no-output-selected result.

Referring now to FIGS. 1(a), 1(b), 1(c), and 1(d), there are shown bitmap representations of a nominal letter "O", a degraded letter "O", a nominal number "7", and a degraded letter "7", respectively. A nominal input is an ideal input with no noise associated with it. A degraded input is one in which noise has created deviations from the nominal input. Degraded inputs may result from either controlled noise or real unpredictable noise.

In a preferred embodiment, the training system of the present invention may train with training inputs of three different quality levels. The first level of training inputs are nominal inputs like those presented in FIGS. 1(a) and 1(c). The second level of training inputs are controlled noise inputs, a type of degraded input created by applying defined noise functions or signals with different characteristics, either independently or in combination, to nominal inputs. The third level of training inputs are real noise inputs, a second type of degraded inputs which, in the case of characters, may be optically acquired images of known characters. Such degraded inputs have real unpredictable noise. FIGS. 1(b) and 1(d) present representations of possible controlled noise inputs and real noise inputs. In a preferred embodiment, the nominal inputs have the highest quality, with the controlled noise inputs and real noise inputs of decreasing lesser quality. Depending upon the controlled noise functions and signals applied, a particular controlled-noise input may be of greater or lessor quality than a particular real-noise input.

The quality of a particular degraded input—of either controlled-noise or real-noise variety—may be determined by comparing the degraded input to a nominal input corresponding to the same known character. In a preferred embodiment, a quality measure may be based on the number of pixels that differ between the two inputs. In another preferred embodiment, the quality measure may be based on conventional feature measures such as Grid or Hadamard features.

In a preferred embodiment, training systems of the present invention train first with the nominal inputs and then later with degraded controlled-noise and real-noise inputs. In this preferred embodiment, training with inputs corresponding to FIGS. 1(a) and 1(c) would precede training with those of FIGS. 1(b) and 1(d). In another preferred embodiment, the training system trains with all inputs of the same known character prior to proceeding to the next known character, and the training inputs of each known character are internally organized by quality. In this preferred embodiment, training with FIG. 1(a) proceeds that with FIG. 1(b), and training with FIG. 1(c) proceeds that with FIG. 1(d). Those skilled in the art will understand that the exact overall sequence of training with all of the inputs is of lessor importance than ordering of inputs by quality for each different known character.

Refinement of Neurons

After the training system of the present invention has completed training, the feature space is populated with neurons that encompass feature vectors, with one feature vector corresponding to each distinct training input. Each neuron may encompass one or more feature vectors—the one at the center of the neuron that was used to create the neuron and possibly other feature vectors corresponding to inputs associated with the same known character.

Depending upon the quality ordering of the training inputs used in the sequential training, a particular neuron may encompass those feature vectors in a more or less efficient manner. For example, if the feature vector used to create a particular neuron corresponds to a highly degraded input, then that feature vector will lie at the center of that neuron. That same neuron may also encompass other feature vectors corresponding to nominal inputs and inputs of lessor degradation. Such a neuron may not be the most efficient neuron for encompassing that set of feature vectors. A classification system using such a neuron may make more misclassifications and non-classifications than one using a more efficient neuron.

A refinement system of the present invention spatially adjusts neurons, created during training, to create more efficient neurons. This refinement system may characterize the spatial distribution of feature vectors encompassed by a particular neuron and then spatially adjust that neuron. Such spatial adjustment may involve translating the neuron from its current center point toward the mean of the spatial distribution of those feature vectors. After translating the neuron, the axis lengths may be adjusted to ensure that feature vectors of the same output character are encompassed by the neuron and to ensure that feature vectors of different output character are excluded.

In an alternative embodiment, the refinement system may spatially adjust two or more neurons of the same character to create one or more neurons that more efficiently encompass the same feature vectors, where a feature vector from one original neuron may be encompassed by a different more efficient neuron. For example, before refinement, a first neuron may encompass feature vectors $F_1$, $F_2$, and $F_3$, and a second neuron may encompass feature vectors $F_4$, $F_5$, $F_6$, and $F_7$. After refinement, feature vectors $F_1$, $F_2$, $F_3$, and $F_4$ may be encompassed by a third neuron, and feature vectors $F_5$, $F_6$, and $F_7$ may be encompassed by a fourth neuron, where the centers and axis lengths of the third and fourth neurons are all different from those of the first and second neurons.

Classifying Systems with Cluster Classifiers

In a first preferred embodiment of the present invention, a classification system classifies inputs into one of a set of possible outputs by comparing the feature vector, for each input to be classified, with every neuron in the feature space. Such classification systems are presented in FIGS. 3 and 4.

Figure 6:
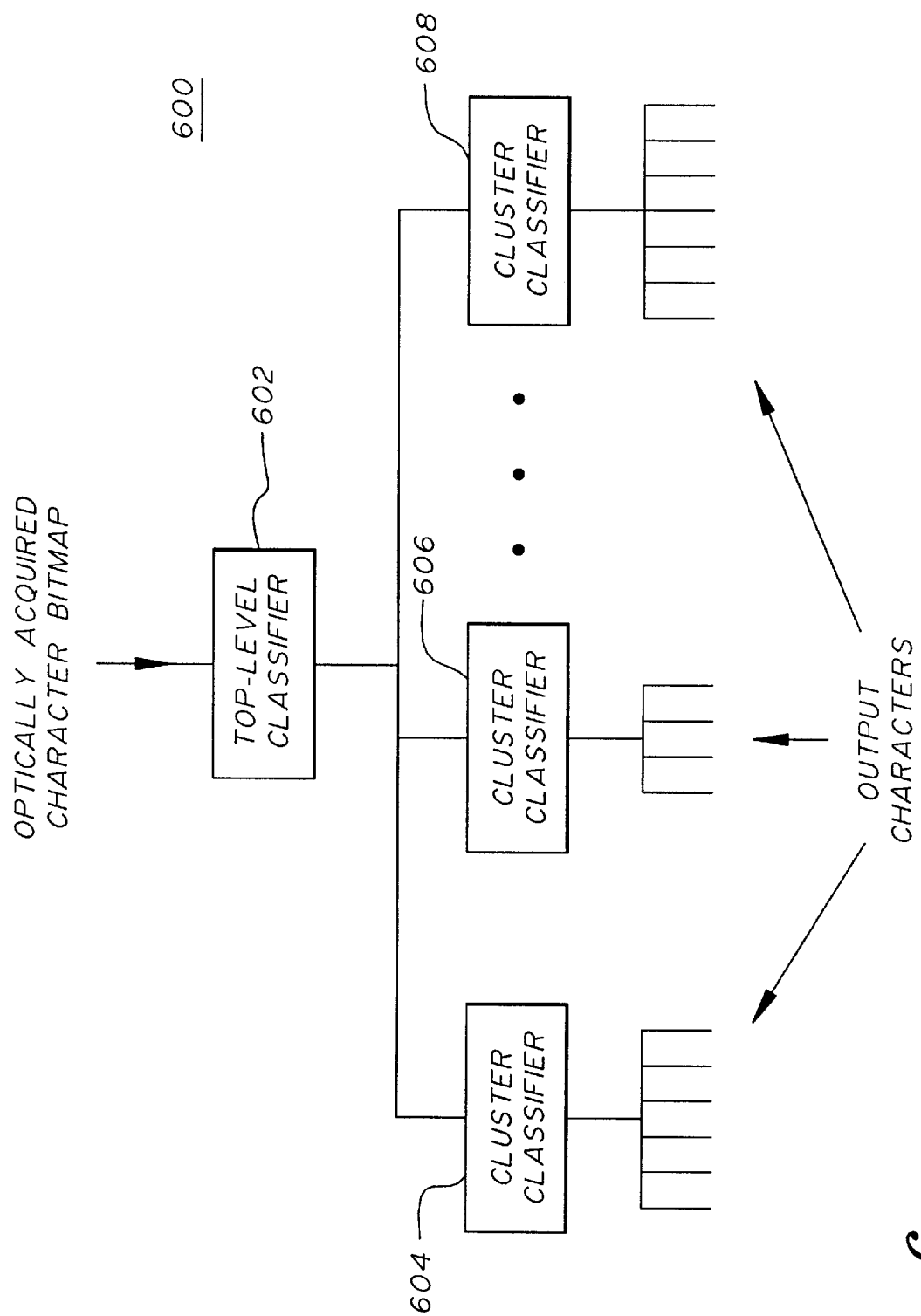
FIG. 6 is a schematic diagram of a classification system that uses cluster classifiers for classifying inputs according to a preferred embodiment of the present invention.

Referring now to FIG. 6, there is shown classification system 600—a second preferred embodiment of the present invention—in which inputs are classified into one of a set of possible outputs using neurons and cluster classifiers. Classification system 600 includes top-level classifier 602 and two or more cluster classifiers 604, 606, ..., 608. Top-level classifier 602 classifies inputs into appropriate clusters of inputs. For example, where classification system 600 classifies characters, top-level classifier 602 may classify input bitmaps corresponding to optically acquired characters into clusters of characters.

The characters clustered together may be those represented by similar bitmaps, or, in other words, those characters associated with feature vectors close to one another in feature space. For example, a first character cluster may correspond to the characters "D", "R" and "B". A second character cluster may correspond to the characters "O", "C", "D", "U", and "Q". A third cluster may correspond to only one character such as the character "Z". A particular character may be in more than one character cluster. In this example, the character "D" is in both the first and the second character clusters, because its bitmaps are similar to those of both clusters.

In a preferred embodiment, before training, characters are clustered based on a confusion matrix. The confusion matrix represents the likelihood that one character will be confused with another character for every possible pair of characters. In general, the closer the feature vectors of one character are to those of another character, the higher the likelihood that those two characters may be confused. For example, the character "D" may have a higher confusion likelihood with respect to the "O" than to the "M", if the feature vectors for "D" are closer to the feature vectors for "O" than to those for "M".

In a preferred embodiment, the clustering of characters is based upon a conventional K-Means Clustering Algorithm, in which a set of templates is specified for each character, where each template is a point in feature space. The K-Means Clustering Algorithm determines where in feature space to locate the templates for a particular character by analyzing the locations of the feature vectors for all of the training inputs corresponding to that character. Templates are preferably positioned near the arithmetic means of clusters of associated feature vectors.

In a preferred embodiment, four templates may be used for each character and the number of characters per cluster may be roughly even. For example, when classifying the 64 characters corresponding to the 26 capital and 26 lower-case letters, the 10 digits, and the symbols "&" and "#", 4×64 or 256 templates may be used to define 7 different clusters of roughly equivalent numbers of characters.

By clustering characters, top-level classifier 602 may implement a classification algorithm that quickly and accurately determines the appropriate cluster for each input. In a preferred embodiment, top-level classifier 602 implements a neuron-based classification algorithm. In another preferred embodiment, other conventional non-neural classification algorithms may be performed by top-level classifier 602. Top-level classifier 602 selects the appropriate cluster for a particular input and directs processing to continue to the appropriate cluster classifier 604, 606, ..., 608. Each cluster classifier is associated with one and only one character cluster, and vice versa.

In one preferred embodiment, each cluster classifier may implement a classification algorithm unique to that character cluster, or shared by only a subset of the total number of character clusters. Each cluster classifier may therefore employ neurons that exist in a feature space unique to that character cluster. For example, training for the "P", "R", "B" cluster may employ a particular set of Grid features, while training for the "O", "C", "D", "U", "Q" cluster may employ a different set of Hadamard features. In that case, different training procedures are performed for each different cluster classifier, where only inputs corresponding to those characters of the associated cluster are used for each different training procedure.

In a third preferred embodiment of the present invention, a classification system according to FIG. 6 may classify inputs into one of a set of possible outputs using neurons and cluster classifiers. In this third embodiment, top-level classifier 602 identifies the template in feature space closest to the feature vector for the current input to be classified. The identified template is associated with a particular character that belongs to one or more character clusters. The top-level classifier 602 directs processing to only those cluster classifiers 604, 606, . . . , 608 associated with the character clusters of the closest template. Since a particular character may be in more than one character cluster, more than one cluster classifier may be selected by top-level classifier 602 for processing.

In a fourth preferred embodiment, each cluster classifier may have a decision tree that identifies those neurons that should be processed for a given input. Prior to classifying, feature vector space for a particular cluster classifier may be divided into regions according to the distribution of feature vectors and/or neurons in feature space. Each region contains one or more neurons, each neuron may belong to more than one region, and two or more regions may overlap. Top-level classifier 602 may determine in which feature-space region (or regions) the feature vector for the current input lies and may direct the selected cluster classifiers to process only those neurons associated with the region (or those regions).

Those skilled in the art will understand that some classification systems of the present invention may use decision trees without cluster classifiers, some may use cluster classifiers without decision trees, some may use both, and others may use neither. Those skilled in the art will further understand that decision trees and cluster classifiers may increase the efficiency of classification systems of the present invention by reducing processing time.

Preferred and Alternative Preferred Embodiments

Those skilled in the art will understand that classifying systems of the present invention may be arranged in series or parallel. For example, in a preferred embodiment, a first character classifier based on Grid features may be arranged in series with a second character classifier based on Hadamard features. In such case, the first classifier classifies a particular bitmap input as one of the known characters or it fails to classify that input. If it fails to classify, then the second classifier attempts to classify that input.

In an alternative embodiment, two or more different classifiers may be arranged in parallel. In such case, a voting scheme may be employed to select the appropriate output by comparing the outputs of each different classifier.

In a preferred embodiment, classification systems and training systems of the present invention perform parallel processing, where each elliptical processing unit may run on a separate computer processor during classification, although those skilled in the art will understand that these systems may also perform serial processing. In a preferred embodiment, the classification systems and training systems may reside in a reduced instruction set computer (RISC) processor such as a SPARC 2 processor running on a SPARCstation 2 marketed by Sun Microsystems.

Those skilled in the art will understand that inputs other than character images may be classified with the classification systems of the present invention. In general, any input may be classified as being one of a set of two or more possible outputs, where a no-selection result is one of the possible outputs. For example, the classification systems of the present invention may be used to identify persons based upon images of their faces, fingerprints, or even earlobes. Other classification systems of the present invention may be used to identify people from recordings of their voices.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for refining a neuron to efficiently encompass a plurality of feature vectors, wherein feature vectors are neither added to nor removed from said neuron, including the steps of:

(a) characterizing the spatial distribution of said feature vectors; and (b) spatially adjusting said neuron in accordance with the characterization of step (a).

2. The method of claim 1, wherein said neuron comprises a boundary defined by two or more neuron areas of different lengths.

3. The method of claim 1, wherein said neuron comprises a center point, and wherein step (b) comprises the step of translating said center point of said neuron toward the mean of said spatial distribution.

4. The method of claim 3, wherein said translated neuron comprises a boundary defined by two or more neuron axes, wherein said translated neuron does not encompass all of said feature vectors, and wherein step (b) further comprises the step of changing the length of at least one of said neuron axes to encompass all of said feature vectors.

5. An apparatus for refining a neuron to efficiently encompass a plurality of feature vectors, wherein said apparatus neither adds nor removes feature vectors to or from said neuron, comprising:

(a) characterizing means for characterizing the spatial distribution of said feature vectors; and (b) adjusting means for spatially adjusting said neuron in accordance with the characterization of step (a).

6. The apparatus of claim 5, wherein said neuron comprises a boundary defined by two or more neuron areas of different lengths.

7. The apparatus of claim 5, wherein said neuron comprises a center point, and wherein said adjusting means translates said center point of said neuron toward the mean of said spatial distribution.

8. The apparatus of claim 7, wherein said translated neuron comprises a boundary defined by two or more neuron axes, wherein said translated neuron does not encompass all of said feature vectors, and wherein said adjusting means changes the length of at least one of said neuron axes to encompass all of said feature vectors.

* * * * *